J. J. ALVORD.
SHEARS.
APPLICATION FILED JAN. 19, 1909.
918,942.
Patented Apr. 20, 1909.
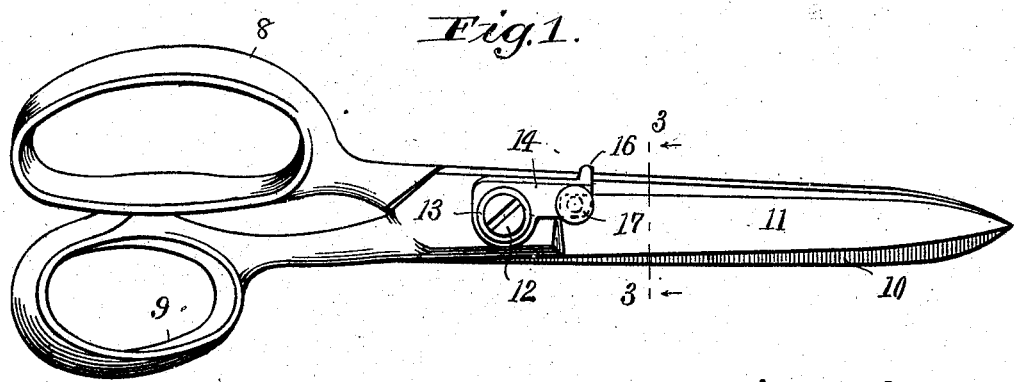
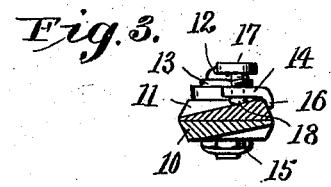
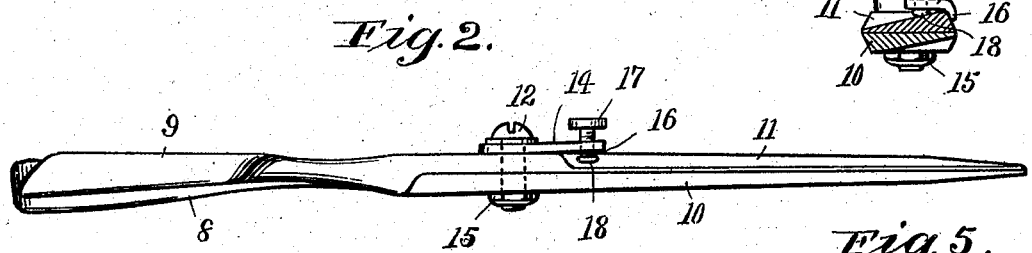
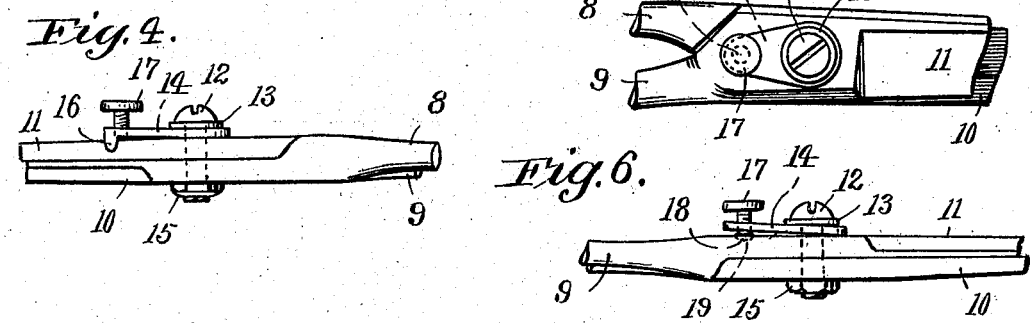
WITNESSES
INVENTOR
John J. Alvord
BY
Chamberlain & Newman
ATTORNEYS

UNITED STATES PATENT OFFICE.

JOHN J. ALVORD, OF BRIDGEPORT, CONNECTICUT.

SHEARS.

No. 918,942.  Specification of Letters Patent.  Patented April 20, 1909.

Application filed January 19, 1909. Serial No. 473,111.

*To all whom it may concern:*

Be it known that I, JOHN J. ALVORD, a citizen of the United States, and resident of Bridgeport, in the county of Fairfield and State of Connecticut, have invented certain new and useful Improvements in Shears, of which the following is a specification.

This invention relates to improvements in shears or scissors and especially to that class known as spring or tension shears, and wherein an adjustable means is provided to compensate for wear upon the edges and pivot of the shear and for retaining the edges of the blades in close operative contact at all times.

My invention is applicable in part to several well known constructions of shears while other features of it are perhaps better adapted to shears of the general type shown in patent to Witt #851,721 of April 30, 1903, which includes in connection with the shear blades and its pivotal screw, a spring or plate and an adjusting screw therefor whereby an adjustable tension for the blades is obtained.

It is the purpose of the invention to improve upon this type of shear by first providing a novel form of friction plate whereby the wear of the blades is taken up and the same retained in close operative engagement, and second to incorporate means for preventing the removal and perhaps the loss of the adjusting screw.

Referring to the accompanying drawings wherein my invention is illustrated, it will be noted that like characters of reference have been used to designate similar parts throughout the several figures, and of which, Figure 1, shows a plan view of the front of a shear in a closed position with my improved friction mechanism attached. Fig. 2, is an edge view of the construction shown in Fig. 1. Fig. 3, is a cross section taken on line 3—3 of Fig. 1, and looking in the direction of the arrows. Fig. 4, is an edge view of a portion of the shear as seen from the opposite side of Fig. 2. Figs. 5 and 6 show a plan and edge view respectively, of the pivotal portion of a shear, blades and handle being broken away, illustrating a feature of my invention applied to a slightly different form of spring plate.

In detail 8 and 9 represent the handle portions for the blades 10 and 11 respectively of a shear, which parts are pivotally connected together by a screw or stud 12 passing first through a washer 13 then a plate 14 and next the said blades. A nut 15 is attached to the extended threaded end of the stud and is seated against the outer face of the under blade 10 to bring the parts snugly together, after which the end of the stud is hammered down and flattened out to prevent the removal of the nut.

The plate 14 as shown in Figs. 1 to 4 inclusive is disposed forward to overhang the beveled portion of the top blade 11 and is provided with a small depending lug 16 which engages the back edge of the top blade 11 to insure the alinement of the said plate 14 with the blade and to form a shoulder against which the screw 17 mounted in the plate draws it, when turned down against the beveled face of the top blade 11 as will be apparent from Fig. 3. This screw is obviously threaded to adjustably engage the threaded hole in the plate so that when the screw is turned it will draw the plate against the washer and head of stud causing a pressure to be brought against the blades in a way to hold them against each other and cause their edges to snugly engage. As the parts become worn the screw may be tightened so as to increase the friction and retain the tension as occasion may require. The lower end of the screw will thus not need to be seated in a hole or socket in the face of the shear member as is now commonly resorted to, but will be held firmly in its proper position against lateral movement when screwed down against the beveled face of the blade which as before stated tends to draw the lug 17 tight against the back edge thereof.

In practice I have found that considerable annoyance, inconvenience and complaints have been caused with this class of shear by the loss of the adjusting screw, which obviously could readily occur with the old forms by reason of its tendency in practice to work out. Therefore, I have conceived the idea of forming an enlargement 18 upon the lower end of the adjusting screw 17, after it has been placed in the plate, which is not alone applicable to the form of plate and shear shown in Figs. 1 to 4 inclusive but likewise to various forms of spring shears wherein the plates are disposed backward upon the handle as illustrated in Figs. 5 and 6 and wherein a recess 19 is employed to center the screw and prevent lateral movement of the friction plate.

Having thus described my invention what by Letters Patent is:

In a shear or scissor, the combination with a blade and a stud upon which the blades are pivoted and having a head upon one end, a spring plate beneath the head and disposed forward in line with the blades and provided with a lug to engage the back edge of the blade, an adjusting screw mounted in the plate and adapted to engage the surface of the bevel portion of the blade, and means to prevent the withdrawal of the screw.

Signed at Bridgeport, in the county of Fairfield, and State of Connecticut, this 14th day of January, A. D., 1909.

JOHN J. ALVORD.

Witnesses:
C. M. NEWMAN,
RUTH RAYMOND.